T. H. GRIGG.
SOUND AMPLIFYING DEVICE.
APPLICATION FILED DEC. 11, 1919.
1,346,491. Patented July 13, 1920.
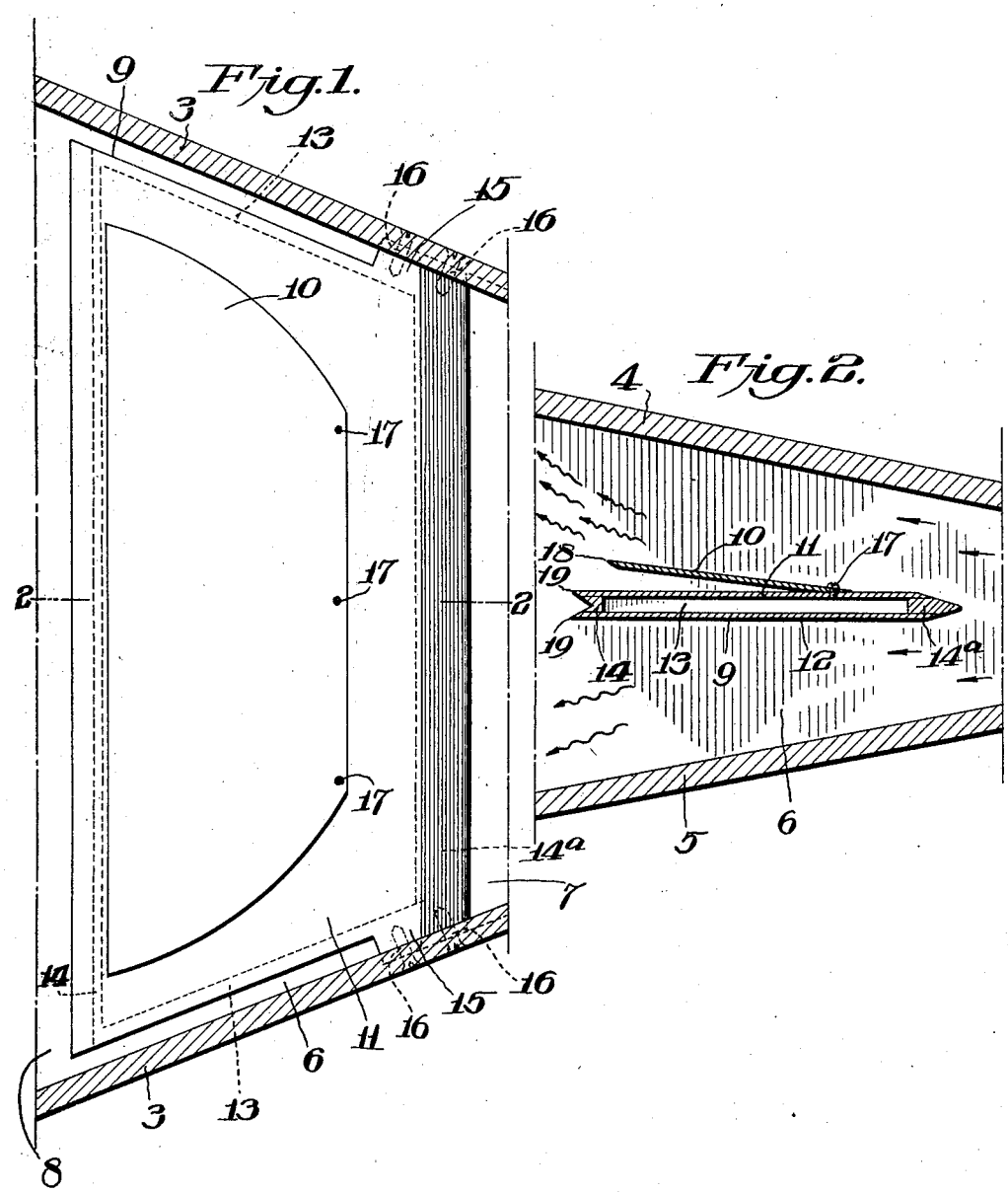
Inventor
Thomas H. Grigg,
By
Attorney

UNITED STATES PATENT OFFICE.

THOMAS H. GRIGG, OF PHILADELPHIA, PENNSYLVANIA.

SOUND-AMPLIFYING DEVICE.

1,346,491.  Specification of Letters Patent.  Patented July 13, 1920.

Application filed December 11, 1919. Serial No. 344,091.

*To all whom it may concern:*

Be it known that I, THOMAS H. GRIGG, a citizen of the United States, residing at Philadelphia, in the county of Philadelphia and State of Pennsylvania, have invented certain new and useful Improvements in Sound-Amplifying Devices, of which the following is a specification.

This invention relates to improvements in sound amplifying devices and aims to provide a novel, simple and highly efficient device for amplifying sound waves and for enriching the tone thereof. The invention is particularly adapted for use in the sound passages leading from the reproducers of phonographs where it has a marked effect in amplifying and enriching the sound waves.

The invention consists in the novel construction, combination and arrangement of parts hereinafter described and claimed.

In the accompanying drawings illustrating my invention,

Figure 1 is a longitudinal section through a wall forming a sound passage showing a face view of a sound amplifying device embodying my invention associated therewith.

Fig. 2 is a longitudinal section through the parts shown in Fig. 1, on line 2—2 thereof.

Referring to the drawings, 3, 3 designate the sides and 4 and 5 the top and bottom, respectively, of a wall forming a portion of a sound passage 6 having an inlet 7 and an outlet 8 for the sound waves. The passage 6 is, preferably, made flaring from the inlet 7 to the outlet 8, as illustrated.

My improved device is associated with the sound passage 6 in such a manner that one or more of its faces is exposed to the sound waves traversing the passage; and, preferably, my device is located wholly within the passage 6.

My invented amplifying device, in its preferred form of embodiment, is formed of wood or other suitable material which will accomplish its purpose and it comprises a hollow, vibratory panel 9 and a vibratory wing 10 mounted thereon.

The panel 9 comprises top and bottom walls 11 and 12, respectively, side walls 13, and front and back walls 14 and 14ª, respectively, the whole being glued or otherwise suitably secured together to form a hollow resonant panel. The sides of the panel 9 are, preferably, shaped to follow the lines of the sides of the sound passage 6. The rearward end of the panel 9 has outwardly projecting lugs or extensions 15 formed thereon which are fitted to the side walls 3 of the sound passage 6 and which penetrate the walls 3 and enter the lugs 15 in a manner to secure the rearward end of the panel 9 to the side walls of the sound passage and hold my improved device in place therein.

The wing 10 is mounted on one face of the panel 9 and has its rearward end engaged therewith and secured thereto by screws 17, leaving its forward end free and spaced from the panel 9, as shown in the drawings. The wing 10 is flared outwardly toward its free end and its attached end does not extend to the side walls 13 of the panel 9 so that when the wing 10 vibrates it will have a pronounced vibratory action upon the wall of the panel 9 to which it is attached.

The panel 9 and the entire amplifying device forwardly of the lugs 15 are out of contact with the walls of the sound passage 6, being surrounded thereby in spaced relation thereto, leaving the forward end of the panel 9 and most if not all of its body free to vibrate under the influence of sound waves traversing the sound passage. Likewise, the wing 10 is surrounded by the walls of the sound passage 6 in spaced relation thereto and it is not only free to be vibrated bodily with the panel 9 but its forward end and most of its body is spaced from the panel 9 and free to vibrate on the panel and independently thereof within the sound passage 6.

The forward ends of the panel 9 and wing 10 are shaped to provide sharp edges 18 and 19 for the escape of sound waves therefrom.

I have discovered that a sound amplifying device constructed as hereinbefore described and used in association with a sound passage amplifies the sound waves and greatly enriches the tone thereof due to the bodily vibration of the hollow panel 9 and the wing 10 mounted thereon and the independent vibrations of the wing 10 upon the panel 9 under the influence of the sound waves traversing the sound passage 6. I have also discovered that when my improved device is used in association with the sound passage of a phonograph, it not only enriches the tone thereof but it also checks or eliminates many or all of the disagreeable noises which usually result from the friction of the reproducing element against the walls of the sound groove of the record.

I claim as my invention:

1. In a sound amplifying device, a wall forming a passage having an inlet and an outlet for sound waves, a sound amplifying panel having one of its end portions fixed and the remaining portion thereof free to vibrate in said passage and having a face exposed to the path of sound waves traversing said passage, and a sound amplifying wing having one end secured to the portion of the panel which is free to vibrate and having another end which is free to vibrate within said passage.

2. In a sound amplifying device, a wall forming a passage having an inlet and an outlet for sound waves, a hollow sound amplifying panel mounted to vibrate in said passage and having a face exposed to the path of sound waves traversing said passage, and a sound amplifying wing having one end secured to said panel and another end free to vibrate within said passage.

In testimony whereof I affix my signature hereto.

THOMAS H. GRIGG.